Sheet 1 - 2 Sheets.
G. D. Dows,
Ice Crusher,
No. 1,462. Fig: 1. Reissued Apr. 28, 1863.
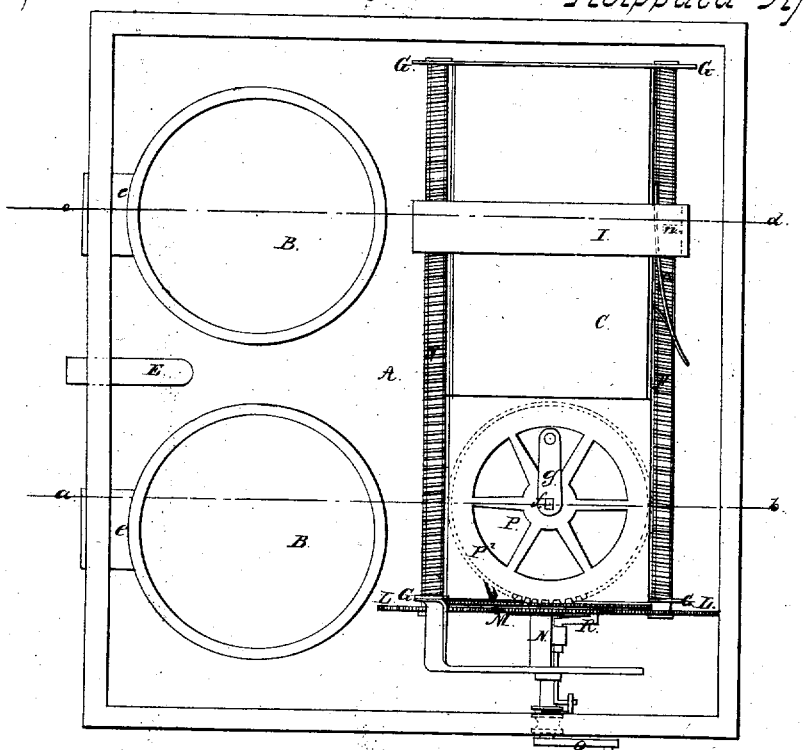
Fig: 2.
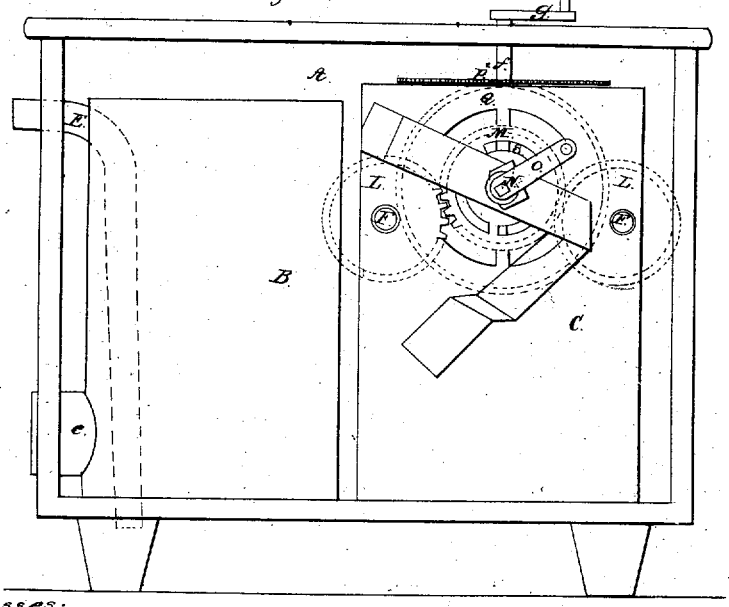
Witnesses:
Geo. Gault.
J. B. Cash.
Inventor:
Gustavus D. Dows.
N. PETERS, PHOTO-LITHOGRAPHER, WASHINGTON, D. C.

Sheet 2-2 Sheets.

G. D. Dows,

Ice Crusher,

No. 1,462. Reissued Apr. 28, 1863.

Witnesses:
W. B. Crosby
Francis Gould

Inventor
Gustavus D. Dows

N. PETERS, PHOTO-LITHOGRAPHER, WASHINGTON, D. C.

UNITED STATES PATENT OFFICE.

GUSTAVUS D. DOWS, OF BOSTON, MASSACHUSETTS.

IMPROVED APPARATUS FOR SODA-WATER, ICE, SIRUPS, &c.

Specification forming part of Letters Patent No. 33,880, dated December 10, 1861; Reissue No. 1,462, dated April 28, 1863.

*To all whom it may concern:*

Be it known that I, GUSTAVUS D. DOWS, of Boston, in the county of Suffolk and State of Massachusetts, have invented a new and useful Apparatus for Preparing and Cooling Beverages; and I do hereby declare that the following, taken in connection with the drawings which accompany and form part of this specification, is a description of my invention sufficient to enable those skilled in the art to practice it.

My invention consists in an apparatus for containing, cooling, and delivering soda, sirups, cream, and other ingredients used in preparing beverages, and for pulverizing or shaving ice to be used with such beverages.

Figure 3:
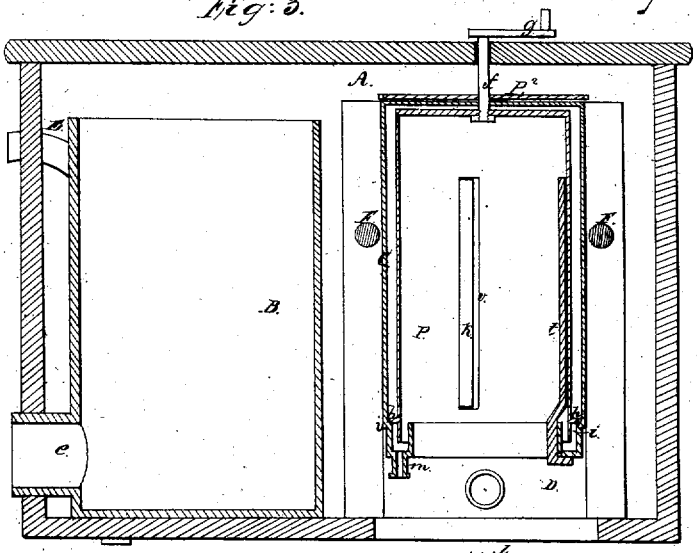
Figure 5:
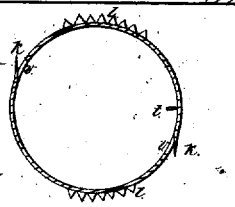
Figure 4:
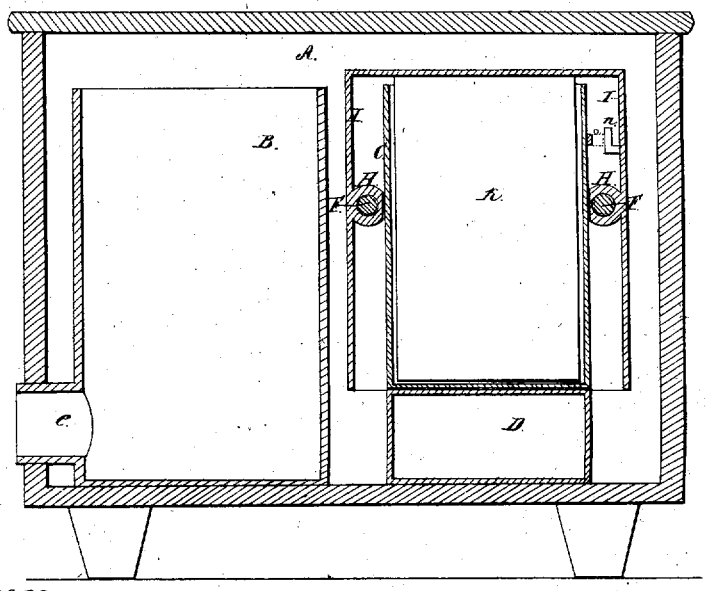

The apparatus is shown in Sheets 1 and 2 of the accompanying drawings, wherein Figure 1 denotes a top view of the interior of the apparatus; Fig. 2, an end elevation thereof with the end wall removed; Fig. 3, a vertical cross-section taken on the line *a b* of Fig. 1; Fig. 4, a vertical cross section taken on the line *c d* of Fig. 1, and Fig. 5 a horizontal section of the cutting-cylinder.

A denotes the enveloping chest, made large enough to contain any desired number of sirup-vessels B, a cream-chest, D, and an ice receptacle or chamber, C, arranged as seen in the drawings, or in any other convenient manner. The pipe E, leading from the soda-fountain, passes through the chest A, it being made to extend nearly across the interior of the chest from top to bottom, so as to keep a considerable length of the pipe cooled. Each of the sirup jars or vessels B is provided with an eduction-pipe, *e*, (extending through the wall of the chest,) to which a suitable faucet is to be applied to draw the sirups, and the cream-reservoir D is also to be provided with an eduction-pipe, delivering outside of the chest A. The ice-chamber C is a long rectangular box open at top, as seen in Fig. 4. Adjacent to the opposite sides thereof are placed two parallel screw-shafts, F F, revolving in bearings G G, and receiving simultaneous motion by means of gear-wheels L L, meshing into and rotated by a gear-wheel, M, fixed on a crank-shaft, N, carrying a crank, *o*, as seen in Figs. 1 and 2. Each screw-shaft F carries a nut, H, affixed to the side of a frame, I, extending over the chamber C. From this frame a follower, K, depends, said follower extending across or nearly across the interior of the chamber C, and nearly to the bottom thereof, as seen in Fig. 4. As rotary motion is communicated to the crank *o*, the shafts F receive simultaneous movement, imparting a horizontal movement to the follower K.

At one end of the ice-chamber C, I place a vertical ice cutting cylinder, P, which is made to rotate by means of a crank, *g*, affixed to the top of a shaft, *f*, extending from the top of the cutting-cylinder through the top of the chamber C. A flange, *h*, on the outer surface of the cutting-cylinder rests on a shelf or bearing, *i*, on the chamber C, and serves, in connection with the bearing of the shaft *f* in the roof of the chest A, to support the cutting-cylinder in position during its revolutions.

On the outer surface of the cylinder I arrange a series of saws or saw-teeth, *l l*, and two or more vertical cutters, *k k*, apertures *v v* extending in rear of the cutters to the interior of the cylinder. As rotation is given to the cylinder, the knives and saws will operate against the cake of ice fed up against its surface, and shave or chip off the ice, the shavings from which will fly into the interior of the cylinder, and fall through the same.

Upon the cylinder-shaft *f* a gear-wheel, $P^2$, is fixed, and made to mesh into another gear-wheel, Q, on the shaft N. The wheel Q fits loosely on the shaft N, and is locked thereto, or to the fast wheel M thereon, by a bolt, R, which shoots into an aperture, S, made in the wheel M. By this means the cutting-cylinder P and follower K may be simultaneously and conjointly operated by the crank *g* or the crank *o*, or by withdrawing the bolt R and making the wheel Q run loosely on its shaft. The cylinder and follower can be operated separately.

The operation of the cutting apparatus is as follows: The follower K being carried to the rear end of the chamber C, and a cake of ice placed in the chamber, and the wheels M and Q locked together, the shaft N or the shaft *f* is rotated. The follower K will press the ice up against the cutting-cylinder, the knives and teeth on which, as they revolve, will chip or shave off the ice, and throw the same into the cylinder, and the action of the follower will keep the ice in contact with the cylinder until it is consumed. The shavings, as they are made, drop through the bottom of the cylinder, and through the chambers C and A into a tumbler or other article held to receive them. A scraper, *t*, (see Fig. 3,) extending from the chamber C up into the cylinder P, and close against the interior surface thereof, serves to scrape off any of the ice or shavings which may adhere to the inner surface of the cylinder. A waste-pipe, *m*, serves to conduct off any water melting from the ice. As the follower K comes into proximity to the cutting-cylinder, a projection, *n*, from the follower pushes against a spring, *o*, fixed to the side of the chamber C, and presses it back in such manner as to cause it to fly back when the projection *n* passes it, giving warning to the attendant that the ice is exhausted. He then withdraws the bolt R, unlocking the wheels M and Q, and by rotating the crank *o* carries the follower back to such extent as to permit a new cake of ice to be placed between it and the cylinder P, the cutting-cylinder during this operation remaining at rest. The wheels M and Q being again interlocked, the cylinder and follower may be again simultaneously operated, as before.

Instead of making the ice-cutter and follower mechanism as described, other means, serving substantially the same purpose, may be used, whereby the ice-feed moves up against a cutting mechanism which shall shave or cut the ice and deliver it in a finely-divided state into any desired receptacle.

The apparatus is intended to be used principally in preparing what are called "ice-cream-soda beverages," in which the cream, sirup, and soda-water are mixed together, and with a small quantity of the pulverized ice, forming a cool and refreshing drink; and by arranging the various vessels for containing the sirups, the cream, and the ice in one enveloping chest, all being made with eduction-pipes extending from the chest, I am enabled to draw the various ingredients for composing beverages in such manner that they can be mixed and served very quickly, allowing a much greater sale and fast delivery of the same than when the various ingredients are arranged in and have to be drawn from vessels placed outside of the chest A, besides which the ingredients, by being kept in the same chest with the ice-chamber C, are kept cool and sweet, and preserved from fermentation.

It is customary in using ice to cool beverages to break the same in the hand, or to scrape it by hand over a scraper, but by using my cutting apparatus all contact of the hand with the ice is avoided, while the ice is much better pulverized, and is readily delivered in any desirable quantity. By my invention, also, economy in the consumption of ice is attained, inasmuch as it can be used in larger bodies than it would be when distributed in two or more separate vessels, besides which one containing vessel does not present as much radiating-surface as do two or more of equal cubic capacity, in the aggregate.

I claim—

1. Arranging and combining with a rotating ice cutter or shaver an ice-containing receptacle in such a manner that the ice therein held shall move toward the cutter, and by the revolutions thereof shall be reduced to a finely-divided state in readiness for use, substantially as described.

2. Arranging an ice-cutter, when made to operate substantially for the purpose described, in combination with a chest containing fluid-receptacles and an ice-containing chamber, in such a manner that the chest and its contents are re-refrigerated by the ice which is operated upon by the cutter.

3. The combination of the cream-chest D, enveloping chest A, ice-chest C, and sirup-vessels B, all arranged substantially as described Executed this 31st day of March, A. D. 1865

GUSTAVUS D. DOWS.

Witnesses:

J. B. CROSBY,

FRANCIS GOULD.